United States Patent
Huang et al.

(10) Patent No.: US 12,481,181 B2
(45) Date of Patent: Nov. 25, 2025

(54) THERMO-OPTIC PHASE SHIFTER SYSTEMS AND METHODS

(71) Applicant: CISCO TECHNOLOGY, INC., San Jose, CA (US)

(72) Inventors: Xue Huang, Maynard, MA (US); Leonard Ketelsen, Maynard, MA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 18/114,761

(22) Filed: Feb. 27, 2023

(65) Prior Publication Data

US 2024/0288717 A1 Aug. 29, 2024

(51) Int. Cl.
*G02F 1/01* (2006.01)
*G02F 1/21* (2006.01)
*G02F 1/225* (2006.01)

(52) U.S. Cl.
CPC ............ *G02F 1/0147* (2013.01); *G02F 1/212* (2021.01); *G02F 1/225* (2013.01)

(58) Field of Classification Search
CPC .................................................... G02F 1/0147
See application file for complete search history.

(56) References Cited

U.S. PATENT DOCUMENTS

| 10,394,059 | B1 * | 8/2019 | Anderson | ............ G02F 1/0147 |
| 12,099,266 | B2 * | 9/2024 | Kikuchi | .................. G02F 1/025 |
| 2005/0100260 | A1 * | 5/2005 | Yamazaki | ............... G02F 1/225 |
| | | | | 385/5 |
| 2017/0336657 | A1 * | 11/2017 | Yamazaki | ............. G02F 1/0147 |
| 2018/0188632 | A1 * | 7/2018 | Celo | ........................ G02F 1/225 |
| 2021/0157211 | A1 * | 5/2021 | Harris | ................... G02F 1/0157 |
| 2022/0365377 | A1 * | 11/2022 | Kikuchi | .................... G02F 1/01 |
| 2024/0288717 | A1 * | 8/2024 | Huang | .................... G02F 1/212 |
| 2024/0345304 | A1 * | 10/2024 | Hannigan | ................ G02B 1/16 |

FOREIGN PATENT DOCUMENTS

CA 2333635 A1 10/2000

OTHER PUBLICATIONS

European Search Report for European Application No. 24159610.5, dated Jun. 14, 2024, 10 Pages.

* cited by examiner

*Primary Examiner* — Rhonda S Peace
(74) *Attorney, Agent, or Firm* — Patterson + Sheridan, LLP (57) ABSTRACT

In part, the disclosure relates to opto-electrical system. The system may include a waveguide defining an optical input and an optical output; a thermo-optic phase shifter (TOPS) that includes a first electrical contact and a second electrical contact, and a resistive heater in electrical communication with the first electrical contact and the second electrical contact, the TOPS configured to change a first phase of light entering the optical input to a second phase for light exiting the optical output, the TOPS having a resistance $R_{TOPS}$, the TOPS in thermal communication with the waveguide; a voltage source in electrical communication with the first electrical contact; and a resistor that includes a first end and a second end, the resistor having a resistance $R_S$, wherein the first end is grounded, wherein the second end is in electrical communication with the second electrical contact.

19 Claims, 4 Drawing Sheets

THERMO-OPTIC PHASE SHIFTER SYSTEMS AND METHODS

FIELD

This disclosure relates generally to the field of photonic integrated circuits.

BACKGROUND

Contemporary photonic systems make extensive use of photonic integrated circuits that are advantageously mass-produced in various configurations for various purposes.

SUMMARY

In part, in one aspect, the disclosure relates to a thermos optic phase shifter (TOPS) system and methods that stabilize the electrical bias applied to the TOPS. In one aspect, the disclosure relates to a TOPS in a voltage divider circuit configuration with a series resistance chosen to match the electrical resistance of the TOPS.

In part, the disclosure relates to opto-electrical system. The system may include a waveguide defining an optical input and an optical output; a thermo-optic phase shifter (TOPS) that includes a first electrical contact and a second electrical contact, and a resistive heater in electrical communication with the first electrical contact and the second electrical contact, the TOPS configured to change a first phase of light entering the optical input to a second phase for light exiting the optical output, the TOPS having a resistance $R_{TOPS}$, the TOPS in thermal communication with the waveguide; a voltage source in electrical communication with the first electrical contact; and a resistor that includes a first end and a second end, the resistor having a resistance RS, wherein the first end is grounded, wherein the second end is in electrical communication with the second electrical contact.

In some embodiments, $R_s$ is substantially equal to $R_{TOPS}$. In some embodiments, $$K = \frac{|R_S - R_{TOPS}|}{R_{TOPS}},$$

wherein K is less than or equal to about 0.2. In various embodiments, the resistor is a variable resistor and $R_s$ is a variable resistance. In various embodiments, $R_s$ is selected such that $R_s$ is approximately the same as $R_{TOPS}$. In many embodiments, $R_s$ is selected such that K is less than or equal to about 0.2, wherein $$K = \frac{|R_S - R_{TOPS}|}{R_{TOPS}}.$$

In various embodiments, $R_s$ is selected to stabilize power bias applied to TOPS from voltage source during aging of TOPS or temperature changes of the TOPS. In some embodiments, $R_s$ ranges from about 1 ohm to about 1,000 ohms.

In some embodiments, the resistive heater is in electrical communication with the voltage source and the resistor, wherein the resistive heater is configured to generate heat when electrical power is applied thereto, wherein a heating temperature of the resistive heater increases with application of increasing electrical power. In some embodiments, the system may include a photonic integrated circuit (PIC), wherein the TOPS is usually part of the PIC, and is in thermal communication with the PIC, wherein the PIC includes a device or is in communication with the device, wherein the device is selected from the group consisting of a laser, a transceiver, a variable optical attenuator, a tunable optical filter; a ring resonator; a phase tuner, a Mach-Zehnder interferometers (MZI), and a modulator.

In another aspect, in part, the disclosure relates to a method of operating an electro-optical device with improved reliability thereof. The method may include providing a thermo-optic phase shifter (TOPS), the TOPS includes a first electrical contact and a second electrical contact; simulating an impedance between the first electrical contact and the second electrical contact of the TOPS as a resistance $R_{TOPS}$; electrically coupling the first electrical contact to a voltage source; and selecting a resistor that includes a first end and a second end and having a resistance $R_s$ such that when the first end is grounded and the second end is electrically coupled to the second electrical contact a power bias of the TOPS remains substantially stable during temperature changes of the TOPS.

In some embodiments, substantially stable means or corresponds to electrical power applied to the TOPS from the voltage source being insensitive to TOPS resistance changes. In some embodiments, $R_s$ is substantially equal to $R_{TOPS}$. In many embodiments, $$K = \frac{|R_S - R_{TOPS}|}{R_{TOPS}},$$

wherein K is less than or equal to about 0.2. In various embodiments, the resistor is a variable resistor and $R_s$ is a variable resistance, that includes the step of adjusting $R_s$ until $$\frac{|R_s - R_{TOPS}|}{R_{TOPS}}$$

is less than or equal to about 0.2. In some embodiments, the TOPS remaining substantially stable avoids measuring voltage source corresponding to identify changes in $R_{TOPS}$ over time due to aging or temperature changes of the TOPS.

In some embodiments, the electrical power of the TOPS may be determined using the following relationship $$P(\varphi) = \left(\frac{V_{source}(\varphi)}{R_{TOPS} + R_S}\right)^2 \cdot R_{TOPS},$$

wherein φ is a phase angle and wherein $$\frac{dP(\varphi)}{dR_{TOPS}} = V_{source}^2(\varphi) \cdot \frac{R_S^2 - R_{TOPS}^2}{(R_{TOPS} + R_S)^4}.$$

In various embodiments, the method may further include selecting $R_s$ to be approximately equal to $R_{TOPS}$ is determined by finding a zero value of $$\frac{dP(\varphi)}{dR_{TOPS}}.$$

In various embodiments, the method may further include integrating the TOPS into a photonic integrated circuit. In many embodiments, when the TOPS resistance changes by 10%, under the same voltage source bias, the electrical power applied to the TOPS changes by an amount less than or equal to about 0.3% or less than or equal to about 0.2%.

In yet another aspect, in part, the disclosure relates to an opto-electrical system. The system may include a waveguide defining an optical input and an optical output; a thermo-optic phase shifter (TOPS) that includes a first electrical contact and a second electrical contact, the TOPS configured to change a first phase of light entering the optical input to a second phase of light, wherein light exiting the optical output is of the second phase, the TOPS having a resistance $R_{TOPS}$, the TOPS in thermal communication with the waveguide, a resistor that includes a first end and a second end, the resistor having a resistance $R_S$, wherein the first end is in electrical communication with the first electrical contact, wherein the second electrical contact is grounded; and a voltage source in electrical communication with the second end.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, thermo-optic phase shifters, voltage sources, resistors, heaters, photonic integrated circuits (PICs), inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

In many embodiments, a thermo-optic phase shifter (TOPS) may be used with or integrated with a waveguide that has an optical input and an optical output. In most embodiments, the TOPS is in thermal communication with a waveguide and/or other electro-optical devices. In most embodiments, the TOPS has two electrical connections such a first electrical contact and a second electrical contact. An applied electrical bias, e.g. from an external voltage source, across the electrical contacts may change a phase of light entering at the optical input to a new optical phase of light exiting from the optical output. As such, in many embodiments, a TOPS may be used in conjunction with or to tune other optical devices such as Mach-Zehnder interferometers (MZI), ring resonators, external-cavity lasers, tunable optical filters, variable optical attenuators, optical modulators, phase tuners, optical transceivers etc.

Figure 1:
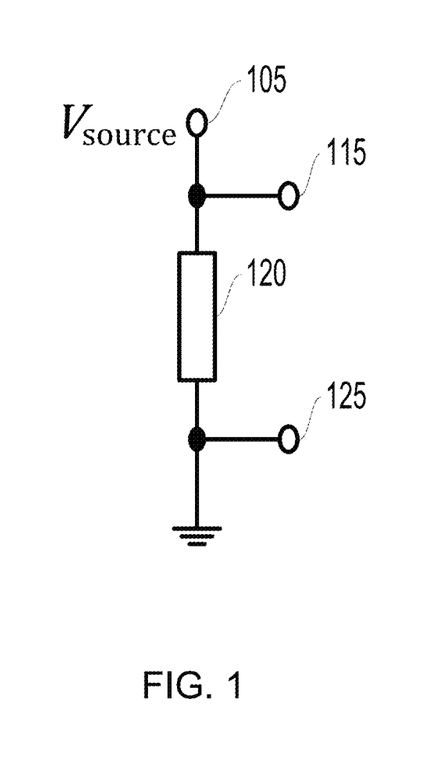
FIG. 1 is a circuit diagram of a thermo-optic phase shifter (TOPS) with marked nodes at the electrical contacts of the TOPS according to an exemplary embodiment of the disclosure.

Refer now to the exemplary embodiment of FIG. 1. FIG. 1 is a diagram of a TOPS element 120, with a first electrical contact 115 and a second electrical contact 125, driven by a source 105 according to an exemplary embodiment of the disclosure. In various embodiments, the source 105 is a voltage source. In many embodiments, an electrical bias applied to a TOPS may determine the optical phase or transmission wavelength of the optical waveguides which are in thermal connection with the TOPS. In many embodiments, a relationship between an optical phase or transmission wavelength and an applied power to a TOPS may be calibrated. In some embodiments, a calibration may be performed by measuring an optical phase φ at the optical output and by calculating an electrical power P(φ) corresponding to an applied voltage $V_{source}$:

$$P(\varphi) = \frac{V_{source}^2(\varphi)}{R_{TOPS0}} \quad (1)$$

where $R_{TOPS0}$ is an electrical resistance of the TOPS, i.e. between the first electrical contact and the second electrical contact of the TOPS, measured at its beginning of life (BOL).

Conversely, in many embodiments, by using a calibrated relationship P(φ), a source voltage $V_{source}$ suitable to achieve a particular optical phase φ may be calculated as $$V_{source} = \sqrt{P(\varphi) \cdot R_{TOPS}}, \quad (2)$$

where $R_{TOPS}$ is a current value of the TOPS resistance. However, in most embodiments, because the resistance of the TOPS may change substantially (up to 10% or more) over the lifetime of the TOPS and/or in response to temperature fluctuations, the value $R_{TOPS}$ taken at the time of the calculation above may differ from the resistance value $R_{TOPS0}$ used at the TOPS BOL during calibration due to changes in temperature or normal aging of the TOPS. Furthermore, in many embodiments, the electrical resistance $R_{TOPS}$ of the TOPS needs be monitored to periodically calculate the applicable source voltage, $V_{source}$ to accounts for TOPS resistance changes or other phenomena.

Figure 2:
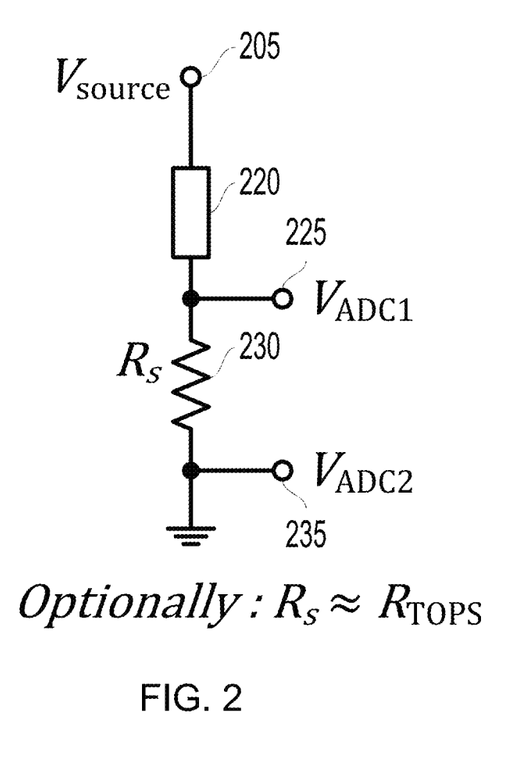
FIG. 2 is a circuit diagram of a TOPS and a series resistance designed to measure a change in a TOPS resistance via an analog-to-digital converter (ADC) according to an exemplary embodiment of the disclosure.

Refer now to the example embodiment of FIG. 2. FIG. 2 is a circuit diagram of a TOPS 220, driven by a source 205, and a series resistor 230 having a resistance $R_s$ according to an exemplary embodiment of the disclosure. In some embodiments, an analog to digital converter (ADC) may be used to monitor the voltage drop across the series resistor 230, i.e. the difference in voltages $V_{ADC1}$ and $V_{ADC2}$, as a way to monitor the TOPS resistance $R_{TOPS}$. The voltage drop may be measured at the two nodes or electrical contacts 225 and 235 that correspond to $V_{ADC1}$ and $V_{ADC2}$, respectively. The current through the series resistance is $$\frac{V_{ADC1} - V_{ADC2}}{R_s}$$

and so the real-time resistance of the TOPS is $$R_{TOPS} = \frac{V_{source} - V_{ADC1}}{V_{ADC1} - V_{ADC2}} \cdot R_s \tag{3}$$

Thus, considering the real-time value of the TOPS resistance $R_{TOPS}$, a source voltage suitable to achieve an output optical phase of $\varphi$ may be specified using the following:

$$V_{source}(\varphi) = \sqrt{\frac{P(\varphi)}{R_{TOPS}} \cdot (R_s + R_{TOPS})} \tag{4}$$

However, in many embodiments, the use of an ADC to monitor the series resistance adds computational, power, ADC, and area costs to the integrated circuit. As discussed in more detail below, in many embodiments, $R_s$ is optionally selected or adjusted such that $R_s \approx R_{TOPS}$. The selection of $R_s \approx R_{TOPS}$ allows the continuous monitoring of resistor 230 to be avoided and advantageously saves on hardware and power costs as discussed in more detail below.

Figure 3A:
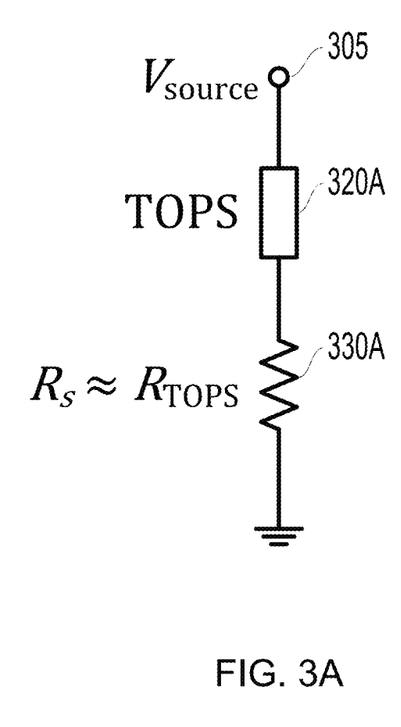
FIG. 3A is a circuit diagram of a voltage divider wherein the bottom resistor is selected to have resistance that matches the electrical resistance of the TOPS within various permitted variations according to an exemplary embodiment of the disclosure.

Refer now to the exemplary embodiment of FIG. 3A. FIG. 3A is a diagram of a circuit configuration as disclosed herein that mitigates the effect of the change in electrical resistance $R_{TOPS}$ of the TOPS 320A on the variability of the calibration and obviates the need for real-time ADC monitoring according to an exemplary embodiment of the disclosure. In some embodiments, the impedance of a given TOPS may be simulated as a resistor having a resistance $R_{TOPS}$ (or one or more resistors in some embodiments). The source 305 is a voltage source. In many embodiments, a resistance $R_s$ 330A having a value substantially equal to the resistance of the TOPS $R_{TOPS}$ (taken at some moment in time, e.g. at BOL) may be added in series with the TOPS or otherwise electrically coupled thereto to form a voltage divider configuration. In most embodiments, when $R_s \approx R_{TOPS}$, or equivalently when a ratio $$K = \frac{|R_s - R_{TOPS}|}{R_{TOPS}}$$

is close to zero, the bias on the TOPS remains stable. In most embodiments, the power applied to the TOPS is equal to $$P(\varphi) = \left(\frac{V_{source}(\varphi)}{R_{TOPS} + R_s}\right)^2 \cdot R_{TOPS} \tag{5}$$

The rate at which the power $P(\varphi)$ changes with $R_{TOPS}$ is $$\frac{dP(\varphi)}{dR_{TOPS}} = V_{source}^2(\varphi) \cdot \frac{R_s^2 - R_{TOPS}^2}{(R_{TOPS} + R_s)^4} \tag{6}$$

which is close to, approximately equal, or even equals zero when $R_s \approx R_{TOPS}$. In some embodiments, Rs may be used to designate the resistance of the resistor used in a given circuit such as the voltage divider configurations shown herein, and also used to identify or label the resistor itself. In some embodiments, K is greater than about 0 and less than about 0.3. In some embodiments, K is greater than about 0 and less than about 0.2. In some embodiments, K is greater than about 0 and less than about 0.1. In some embodiments, K is greater than about 0 and less than about 0.05.

Figure 3B:
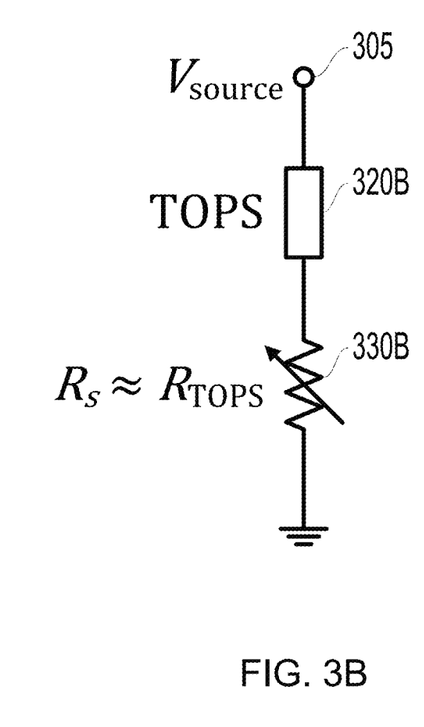
FIG. 3B is a circuit diagram of a TOPS in a voltage divider wherein the bottom resistor is a variable resistor according to an exemplary embodiment of the disclosure.

Refer also to the embodiment of FIG. 3B. FIG. 3B is an alternative circuit configuration using a variable resistor 330B in series with the TOPS 320B according to an exemplary embodiment of the disclosure. A variable resistor may allow more precise matching of the series resistance $R_s$ and the TOPS resistance $R_{TOPS}$ at various stages of the device's fabrication or operation. For example, in some embodiments, given the advantages of having $R_s \approx R_{TOPS}$, the variable resistor having resistance $R_s$ may be set at $R_{TOPS}$ or about $R_{TOPS}$ or approximately $R_{TOPS}$ In various embodiments, $R_s$ may be selected (if fixed) or set (if variable) such that $$\frac{|R_s - R_{TOPS}|}{R_{TOPS}}$$

is less than about 0.2. As shown in the embodiments, of FIGS. 3A and 3B, the resistor may be grounded.

Figure 3C:
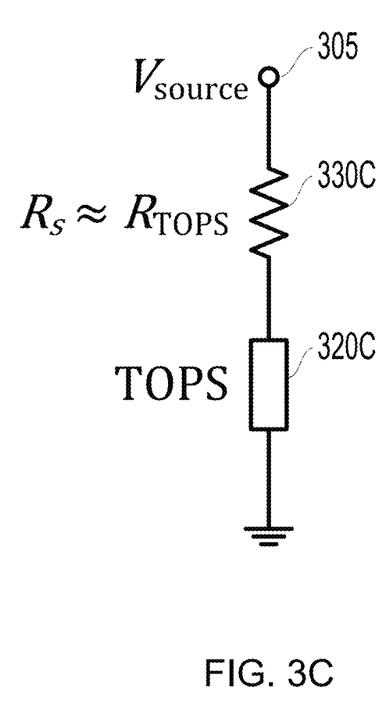
FIG. 3C is a circuit diagram of a TOPS in a voltage divider wherein the TOPS and the resistor are in an alternative configuration according to an exemplary embodiment of the disclosure.

Refer also to the embodiment of FIG. 3C. FIG. 3C is an alternative circuit configuration wherein the TOPS and the resistor $R_s$ are reversed in position relative to the embodiments of FIG. 3A or 3B. As shown, the TOPS 320C is the bottom element in the voltage divider and the resistor $R_s$ 330C is the top element in the voltage divider. In some embodiments, one terminal or electrical contact of the TOPS 320C may be grounded as shown. In the embodiment of FIG. 3C, the resistor $R_s$ is chosen in a manner similar to that of the embodiment of FIG. 3A, i.e. $R_s \approx R_{TOPS}$ or equivalently $$\frac{|R_s - R_{TOPS}|}{R_{TOPS}} \approx 0.$$

The relationships P(φ) and $$\left|\frac{dP(\varphi)}{dR_{TOPS}}\right|$$

(Equations (5) and (6), respectively) are symmetric with respect to $R_s$ and $R_{TOPS}$ and so the bias to the TOPS in the embodiment of FIG. 3C remains substantially stable. In general, in various embodiments, the various components disclosed herein may be electrically coupled or connected in various configurations that incorporate the voltage divider features and the advantages relative to TOPS bias stability and reliability over time. In various embodiments, the TOPS may include one or more heating elements or devices such as, for example, a resistive heater.

Figure 4:
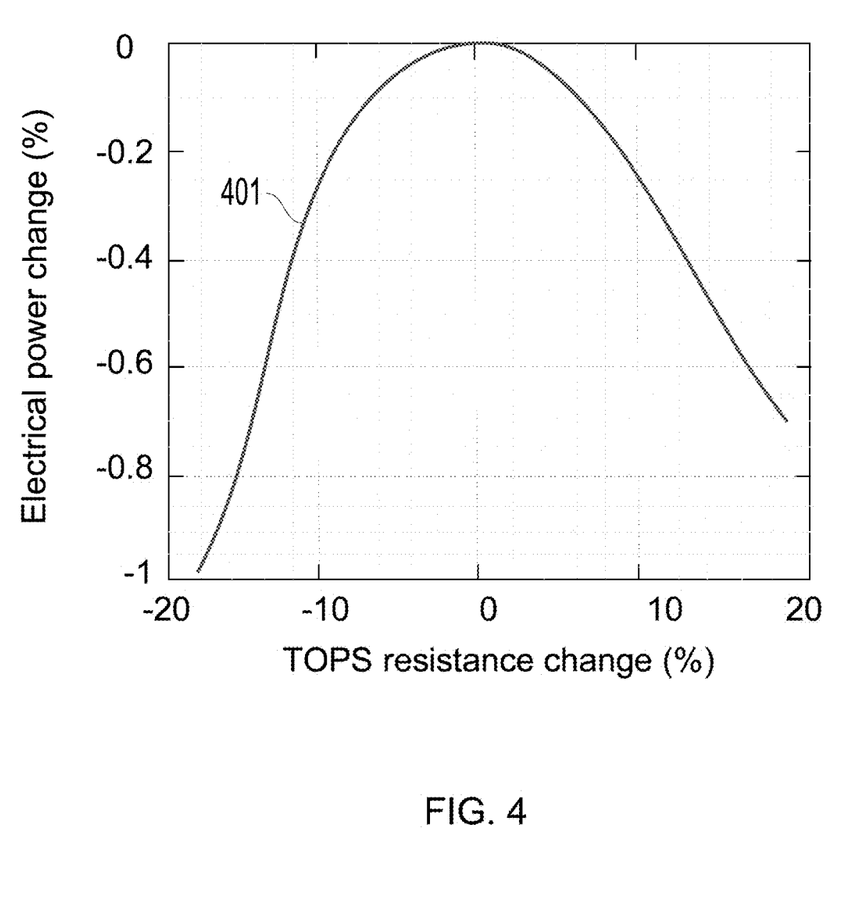
FIG. 4 is a plot of a percent change in power applied to a TOPS versus a percent change in an electrical resistance of a TOPS according to an exemplary embodiment of the disclosure.

Refer now to FIG. 4. FIG. 4 is a plot 401 of a percent change in electrical power P (applied to the TOPS) versus a percent change in TOPS resistance $R_{TOPS}$ using a voltage divider configuration as disclosed herein, such as in FIG. 3A, 3B, or 3C, wherein $R_s \approx R_{TOPS}$. According to FIG. 4, a 10% change $R_{TOPS}$ produces a change of less than about 0.3% or less than about 0.2% in the power applied to the TOPS, under the same voltage source bias (at 305 as shown in FIGS. 3A, 3B, and 3C) as calibration value. In short, the TOPS circuit configuration enables stable electrical power bias on TOPS (change by less than about 0.3%), even if the TOPS resistance has changed dramatically.

Figure 5:
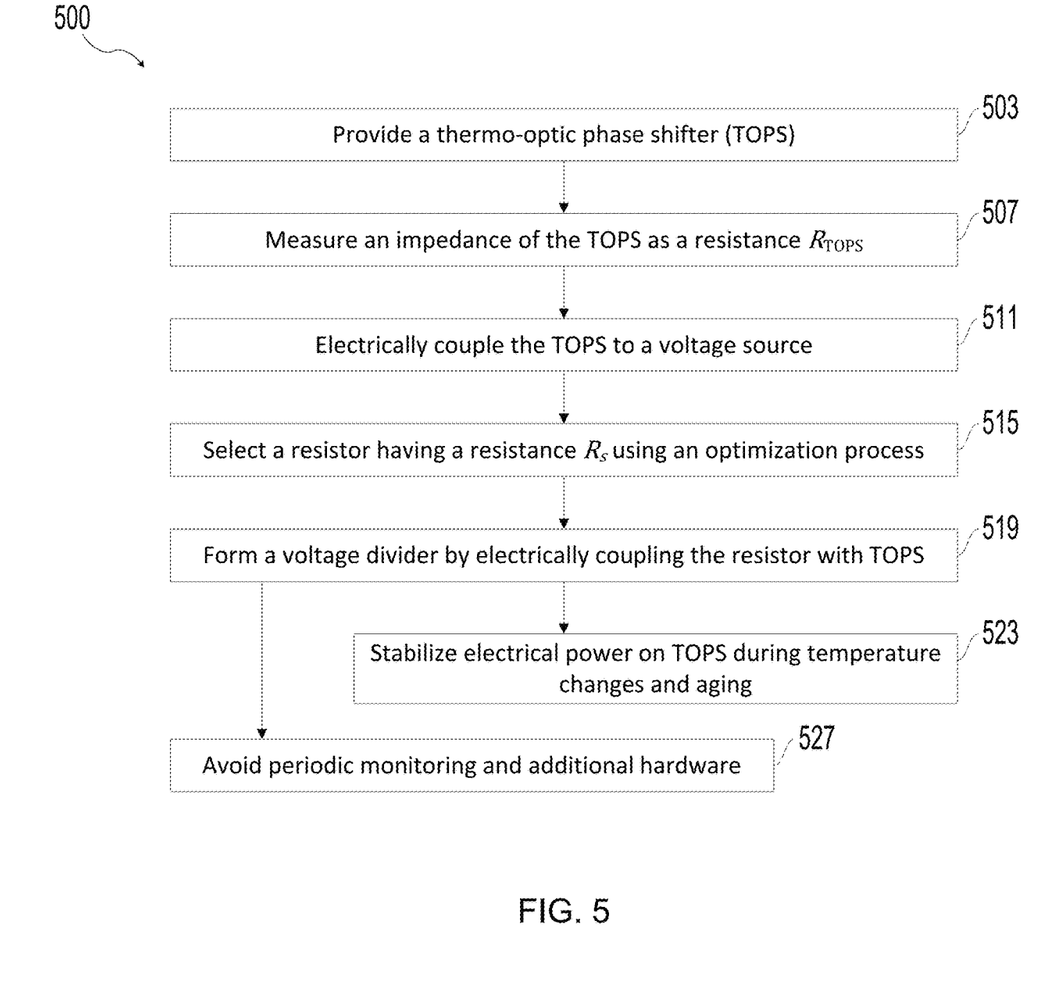
FIG. 5 is a flow chart of an exemplary method suitable for improving stability of a TOPS according to an exemplary embodiment of the disclosure.

Refer now to FIG. 5. FIG. 5 is a flow chart of a method 500 for improving the stability of an electrical bias of a TOPS. In many embodiments, a provided TOPS 503 is first measured 507 to obtain a resistance $R_{TOPS}$, where $R_{TOPS} = R_{TOPS0}$ if the measurement is taken at the TOPS BOL. In most embodiments, the TOPS is then electrically coupled 511 to a voltage source. In most embodiments, a resistor is then selected 515 having resistance $R_s$ chosen according to an optimization process wherein $R_s \approx R_{TOPS}$. In some embodiments, the resistor is fixed or variable. In some embodiments, the optimization process may including find a relative maxima or minima of the relationship of $$\frac{dP(\varphi)}{dR_{TOPS}}$$

as described above with regard to equation 6. In some embodiments, other optimization methods such as interpolation, curve fitting, and the tuning of a variable resistor may be used. The TOPS and the resistor are then electrically coupled in series to define or create a voltage divider configuration. In many embodiments, the resultant circuit configuration stabilizes 523 the electrical power on TOPS and the optical phase tuning of the TOPS during temperature changes and device aging. In most embodiments, such a voltage divider configuration furthermore avoids 527 continuous or periodic monitoring of the voltage drop across the TOPS and so also avoids additional area- and cost-consuming ADC channels dedicated to the TOPS.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. An opto-electrical system comprising:
  a waveguide defining an optical input and an optical output;
  a thermo-optic phase shifter (TOPS) comprising:
    a first electrical contact and a second electrical contact, and
    a resistive heater in electrical communication with the first electrical contact and the second electrical contact,
      the TOPS configured to change a first phase of light entering the optical input to a second phase for light exiting the optical output,
      the TOPS having a resistance $R_{TOPS}$,
      the TOPS in thermal communication with the waveguide;
  a voltage source in electrical communication with the first electrical contact; and
  a resistor comprising a first end and a second end, the resistor having a resistance Rs, wherein the first end is grounded, wherein the second end is in electrical communication with the second electrical contact, wherein the resistor is a variable resistor and $R_s$ is a variable resistance.

2. The system of claim 1, wherein $R_s$ is substantially equal to $R_{TOPS}$.

3. The system of claim 1, wherein $$K = \frac{|R_S - R_{TOPS}|}{R_{TOPS}},$$

wherein K is less than or equal to about 0.2.

4. The system of claim 1, wherein $R_s$ is selected such that $R_s$ is approximately the same as $R_{TOPS}$.

5. The system of claim 1, wherein $R_s$ is selected such that K is less than or equal to about 0.2, wherein $$K = \frac{|R_S - R_{TOPS}|}{R_{TOPS}}.$$

6. The system of claim 1, wherein $R_s$ is selected to stabilize power bias applied to the TOPS from a voltage source during aging of the TOPS or temperature changes of the TOPS.

7. The system of claim 1, wherein $R_s$ ranges from about 1 ohm to about 1,000 ohms.

8. The system of claim 1, wherein the resistive heater is in electrical communication with the voltage source and the resistor, wherein the resistive heater is configured to generate heat when electrical power is applied thereto, wherein a heating temperature of the resistive heater increases with application of increasing electrical power.

9. The system of claim 1 further comprising a photonic integrated circuit (PIC), wherein the TOPS is part of the PIC, and is in thermal communication with the PIC, wherein the PIC comprises a device or is in communication with the device, wherein the device is selected from the group consisting of a laser, a transceiver, a variable optical attenuator, a tunable optical filter, a ring resonator, a phase tuner, a Mach-Zehnder interferometers (MZI), and a modulator.

10. A method of operating an electro-optical device with improved reliability thereof, the method comprising:
  providing a thermo-optic phase shifter (TOPS), the TOPS comprising a first electrical contact and a second electrical contact;
  simulating an impedance between the first electrical contact and the second electrical contact of the TOPS as a resistance $R_{TOPS}$;
  electrically coupling the first electrical contact to a voltage source; and
  selecting a resistor comprising a first end and a second end and having a resistance $R_s$ such that when the first end is grounded and the second end is electrically coupled to the second electrical contact a power bias of the TOPS remains substantially stable during temperature changes of the TOPS, wherein substantially stable means or corresponds to electrical power applied to the TOPS from the voltage source being insensitive to TOPS resistance changes.

11. The method of claim 10, wherein $R_s$ is substantially equal to $R_{TOPS}$.

12. The method of claim 10, wherein $$K = \frac{|R_S - R_{TOPS}|}{R_{TOPS}},$$

wherein K is less than or equal to about 0.2.

13. The method of claim 10, wherein the resistor is a variable resistor and $R_s$ is a variable resistance, further comprising the step of adjusting $R_s$ until $$\frac{|R_S - R_{TOPS}|}{R_{TOPS}}$$

is less than or equal to about 0.2.

14. The method of claim 10 wherein the TOPS remaining substantially stable avoids measuring a voltage source to identify changes in $R_{TOPS}$ over time due to aging or temperature changes of the TOPS.

15. The method of claim 10, wherein the electrical power of the TOPS is determined using the following relationship $$P(\varphi) = \left(\frac{V_{source}(\varphi)}{R_{TOPS} + R_S}\right)^2 \cdot R_{TOPS},$$

wherein φ is a phase angle and wherein $$\frac{dP(\varphi)}{dR_{TOPS}} = V_{source}^2(\varphi) \cdot \frac{R_S^2 - R_{TOPS}^2}{(R_{TOPS} + R_S)^4}.$$

16. The method of claim 15 further comprising selecting $R_s$ to be approximately equal to $R_{TOPS}$ is determined by finding a zero value of $$\frac{dP(\varphi)}{dR_{TOPS}}.$$

17. The method of claim 10 further comprising integrating the TOPS into a photonic integrated circuit.

18. The method of claim 10, wherein when the TOPS resistance changes by 10%, under the same voltage source bias, the electrical power applied to the TOPS changes by an amount less than or equal to about 0.3% or less than or equal to about 0.2%.

19. An opto-electrical system comprising:
- a waveguide defining an optical input and an optical output;
- a thermo-optic phase shifter (TOPS) comprising:
  - a first electrical contact and a second electrical contact, the TOPS configured to change a first phase of light entering the optical input to a second phase of light, wherein light exiting the optical output is of the second phase,
  - the TOPS having a resistance $R_{TOPS}$,
  - the TOPS in thermal communication with the waveguide,
- a resistor comprising a first end and a second end, the resistor having a resistance Rs, wherein the first end is in electrical communication with the first electrical contact, wherein the second electrical contact is grounded, wherein $R_s$ is substantially equal to $R_{TOPS}$, and
- a voltage source in electrical communication with the second end.

* * * * *